(12) United States Patent
Zhang et al.

(10) Patent No.: US 9,320,008 B2
(45) Date of Patent: Apr. 19, 2016

(54) METHOD AND APPARATUS FOR DETERMINING GEOGRAPHIC POSITION OF MOBILE TERMINALS

(75) Inventors: Yang Zhang, Sollentuna (SE); Di Shu, Shanghai (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/390,502

(22) PCT Filed: Apr. 5, 2012

(86) PCT No.: PCT/CN2012/073531
§ 371 (c)(1),
(2), (4) Date: Oct. 3, 2014

(87) PCT Pub. No.: WO2013/149382
PCT Pub. Date: Oct. 10, 2013

(65) Prior Publication Data
US 2015/0080017 A1    Mar. 19, 2015

(51) Int. Cl.
*H04W 64/00* (2009.01)
*G06F 17/30* (2006.01)
*G01S 5/00* (2006.01)
*G01S 5/02* (2010.01)
*H04W 4/02* (2009.01)

(52) U.S. Cl.
CPC ............ *H04W 64/00* (2013.01); *G01S 5/0009* (2013.01); *G01S 5/0252* (2013.01); *G06F 17/30241* (2013.01); *H04W 4/02* (2013.01)

(58) Field of Classification Search
CPC ....... H04W 4/02; H04W 64/00; G01S 5/0252
USPC .......................... 455/414.2, 456.1, 456.2, 457
See application file for complete search history.

(56) References Cited

U.S. PATENT DOCUMENTS

| 2004/0203856 | A1 | 10/2004 | Wigren et al. |
| 2005/0174283 | A1 | 8/2005 | Muramatsu et al. |
| 2005/0192031 | A1* | 9/2005 | Vare ...................... H04W 36/32 455/456.6 |

FOREIGN PATENT DOCUMENTS

| CN | 101346000 | 1/2009 |
| CN | 102033918 | 4/2011 |
| EP | 2068120 A1 | 6/2009 |
| WO | WO-2009155987 | 12/2009 |

OTHER PUBLICATIONS

PCT Notification Concerning Transmittal of International Preliminary Report on Patentability (Chapter I) for Counterpart PCT Application No. PCT/CN2012/073531, mailed Oct. 16, 2014, 6 pages.
PCT International Search Report for Counterpart PCT Application No. PCT/CN2012/073531, (Jan. 10, 2013), 4 pages.

(Continued)

*Primary Examiner* — Sam Bhattacharya
(74) *Attorney, Agent, or Firm* — NDWE LLP

(57) ABSTRACT

A method of determining geographic position of mobile terminals in a mobile communication network comprises receiving raw measurement data in the mobile communication network, adapting the raw measurement data to be stored in an image format, and determining geographic position of mobile terminals based on the raw measurement data stored in the image format.

20 Claims, 6 Drawing Sheets

(56) References Cited

OTHER PUBLICATIONS

"BMP file format", Wikipedia, http://en.wikipedia.org/wiki/BMP_file_format, (Jul. 14, 2014), 9 pages.
"Evaluation of path-loss technologies for Location Services (LCS) (Release 9)", *3GPP TR 25.907, Version 9.0.1, 3rd Generation Partnership Project, Technical Specification Group Services and System Aspects*, (Jan. 2010), 35 pages.
"JPEG", *Wikipedia*, http://en.wikipedia.org/wiki/Jpeg, (Aug. 6, 2014), 20 pages.
"JPEG 2000", *Wikipedia*, http://en.wikipedia.org/wiki/JPEG_2000, (Jun. 23, 2014), 10 pages.
"Portable Network Graphics", *Wikipedia*, http://en.wikipedia.org/wiki/Portable_Network_Graphics, (Aug. 6, 2014), 22 pages.
Wigren, Torbjörn, "Adaptive Enhanced Cell-ID Fingerprinting Localization by Clustering of Precise Position Measurements", *IEEE Transactions on Vehicular Technology*, 56(65), (Sep. 2007), 12 pages.
Extended European Search Report, EP Application No. 12873661.8, Oct. 23, 2015, 6 pages.
Jani Vare et al., "Approach for Improving Receiver Performance in Loss-free Handovers in DVB-H Networks," Nov. 29, 2004, pp. 3326-3331, Globecom 2004, IEEE Communications Society.

* cited by examiner

METHOD AND APPARATUS FOR DETERMINING GEOGRAPHIC POSITION OF MOBILE TERMINALS

CROSS-REFERENCE TO RELATED APPLICATIONS

This application is a National stage of International Application No. PCT/CN2012/073531, filed Apr. 5, 2012, which is hereby incorporated by reference.

TECHNICAL FIELD

The present application relates to telecommunications, and in particular to geographic position determination of terminals such as mobile terminals.

BACKGROUND

Determination of position location can be important for many different types of equipment, particularly for mobile terminals. For example, determination of position location can allow the user of the mobile terminals to ascertain the user's whereabouts, enabling the user to make appropriate navigation or other decisions. In addition, when provided to a third party, information regarding position location of mobile terminals can enable the third party to locate and provide assistance or render service to the user.

There are several positioning technologies which can be used to determine the position of mobile terminals. They are Observed Time Difference of Arrival (OTDOA) positioning, Assisted Global Positioning System (A-GPS) positioning, and fingerprinting positioning etc. Among these positioning technologies, fingerprinting positioning technology is now widely used and also discussed during 3GPP standardization.

Also known as Radio Pattern Matching or Radio Signature, fingerprinting technology represents a family of path loss based technologies that rely on matching the RF environment (as experienced by the mobile terminals) to the known characteristics of the larger RF system in which the mobile terminals are operating. Whenever a position request arrives, a radio fingerprint is first measured, after which the corresponding grid points with similar characteristic are looked up and a location estimate is calculated and reported. The fingerprint may e.g. consist of The cell Ids that are detected by the terminal, in each grid point;
Quantized path loss or signal strength measurements, with respect to multiple radio base stations, performed by the terminal, in each grid point;
Quantized Round Trip Time (RTT, in WCDMA) or Timing Advance (TA, in GSM and LTE) or UE Rx-Tx time difference (in LTE) in each grid point;
Quantized noise rise, representing the load of a CDMA system, in each grid point;
Quantized signal quality;
Radio connection information like the radio access bearer (RAB);
Quantized time.

It can be seen, fingerprinting positioning technology requires a large number of field measurements, together with simulated measurements, for being used as reference inputs. Such measurements require a remarkable capacity for storage which increases cost and lowers look-up efficiency. Besides fingerprinting positioning, other positioning technologies may face similar problems.

SUMMARY OF INVENTION

It is therefore one of the objectives of the present application to provide a mechanism for determining geographic position of mobile terminals, in order to efficiently store the large amount of data necessary for positioning.

According to one embodiment of the present invention, there is provided a method of determining geographic position of mobile terminals in a mobile communication network. The method comprises the steps of receiving raw measurement data in the mobile communication network, adapting the raw measurement data to be stored in an image format, and determining geographic position of mobile terminals based on the raw measurement data stored in the image format.

According to another embodiment of the present invention, there is provided an apparatus for determining geographic position of mobile terminals in a mobile communication network. The apparatus comprises a receiver to receive raw measurement data in the mobile communication network, a conversion unit to adapt the raw measurement data to be stored in an image format and a determining unit to determine geographic position of mobile terminals based on the raw measurement data stored in the image format.

According to another embodiment of the present invention, there is provided an interface for sharing raw measurement data between two entities in a mobile communication network, the raw measurement data being adapted to be stored in an image format for determining geographic position of mobile terminals.

According to another embodiment of the present invention, there is provided a computer program product comprising a computer usable medium. The computer usable medium has a computer readable program code embodied therein. The code is adapted to be executed to implement a method of determining geographic position of mobile terminals in a mobile communication network.

It should be emphasized that the embodiments of the invention described above are merely possible examples, among others, of the implementations, setting forth a clear understanding of the principles of the invention. Other details and advantages of the invention will become apparent from the following detailed description in combination with the accompanying figures illustrating the principles and operation of the invention.

BRIEF DESCRIPTION OF THE DRAWINGS

Various embodiments and aspects of the invention are described in detail below with reference to the accompanying figures. It is to be appreciated that the accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Certain terms are used throughout the description and following claims to refer to particular components. As one skilled in the art will appreciate, electronic equipment manufactures may refer to a component by different names. This document does not intend to distinguish between components that differ in name but not function. It should be emphasized that the term "comprises/comprising" when used in this specification is taken to specify the presence of stated features, integers, steps or components but does not preclude the presence or addition of one or more other features, integers, steps, components or groups thereof. Also, as used in the specification including the appended claims, the singular forms "a", "an", and "the" include the plural unless the context clearly dictates otherwise.

In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In a typical cellular communication system, mobile terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS). In some networks a base station may also be called a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the mobile terminals within the range of the base stations.

Figure 1:
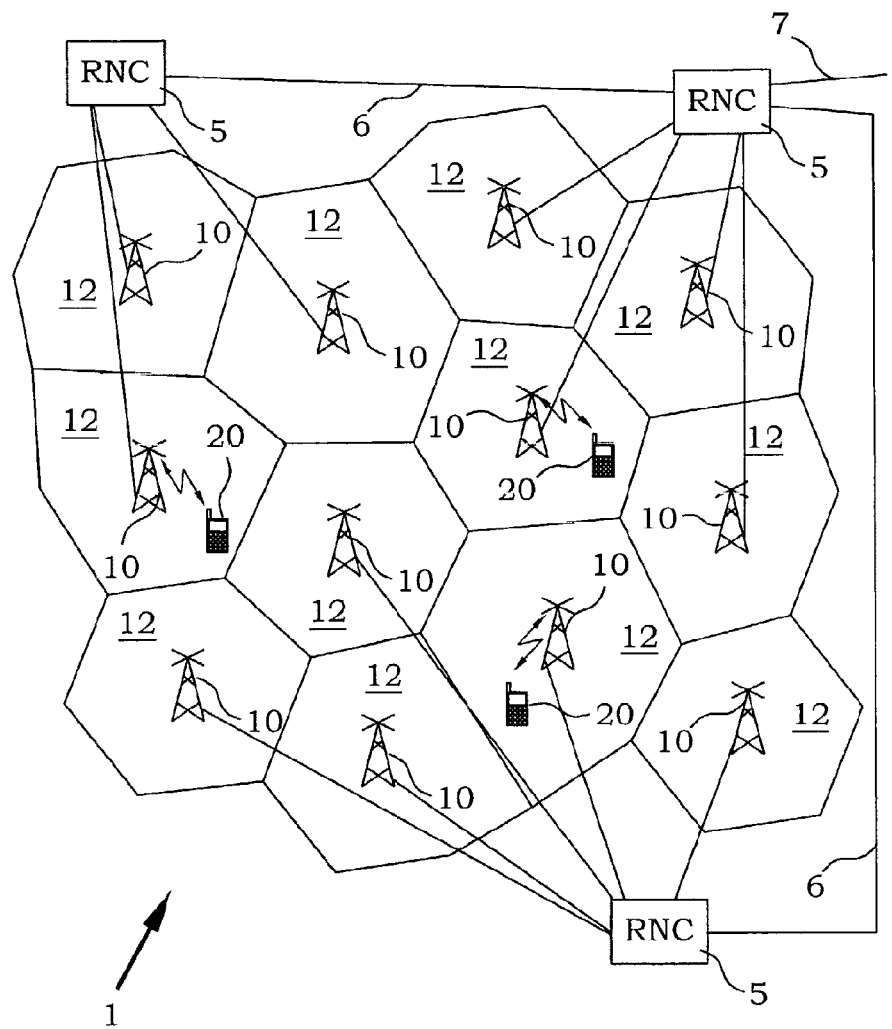
FIG. 1 illustrates an existing cellular communication system.

FIG. 1 illustrates an existing cellular communication system 1. The area covered by the system is divided in cells 12. Each cell has a stationary base station 10, which is responsible for the radio communication with mobile terminals 20 positioned within the area of respective cell 12. The base stations 10 are connected to a common network 6 comprising radio network controllers (RNC) 5 and connections 7 to external networks.

In cellular communication systems such as one shown in FIG. 1, there already exists various kinds of positioning technologies used to determine the position of mobile terminals. They are, for example, Observed Time Difference of Arrival (OTDOA) positioning, Assisted Global Positioning System (A-GPS) positioning, and fingerprinting positioning. Among them, fingerprinting positioning is a very active field currently, with application in e.g. indoor positioning system. Basic fingerprinting uses radio measurements from multiple base stations (e.g. signal strength or path-loss measurements) to provide a "fingerprint" of the radio conditions at a specific geographic position. This position is normally determined by some sort of reference position measurement, e.g. using differential GPS or manual mapping. In that way a radio condition map is created, so that the position of a terminal can be looked up after the radio conditions have been determined by measurements. The fingerprinting positioning technology works well with existing mobile terminals without any modification.

However, fingerprinting positioning technology needs a large number of field measurements or simulated ones which require remarkable capacity in the positioning node, rendering a low storage and look-up efficiency. Note that the positioning node may be any one of stationary base station 10, mobile terminals 20 and RNC 5 as shown in FIG. 1. Fingerprinting positioning algorithms operate by creating a radio fingerprint for each point of a fine coordinate grid that covers the Radio Access Network (RAN). In one case, the fingerprint may e.g. consist of The cell Ids that are detected by the terminal, in each grid point;

Quantized path loss or signal strength measurements, with respect to multiple radio base stations, performed by the terminal, in each grid point;

Quantized Round Trip Time (RTT, in WCDMA) or Timing Advance (TA, in GSM and LTE) or UE Rx-Tx time difference (in LTE) in each grid point;

Quantized noise rise, representing the load of a CDMA system, in each grid point;

Quantized signal quality;

Radio connection information like the radio access bearer (RAB);

Quantized time.

Figure 2:
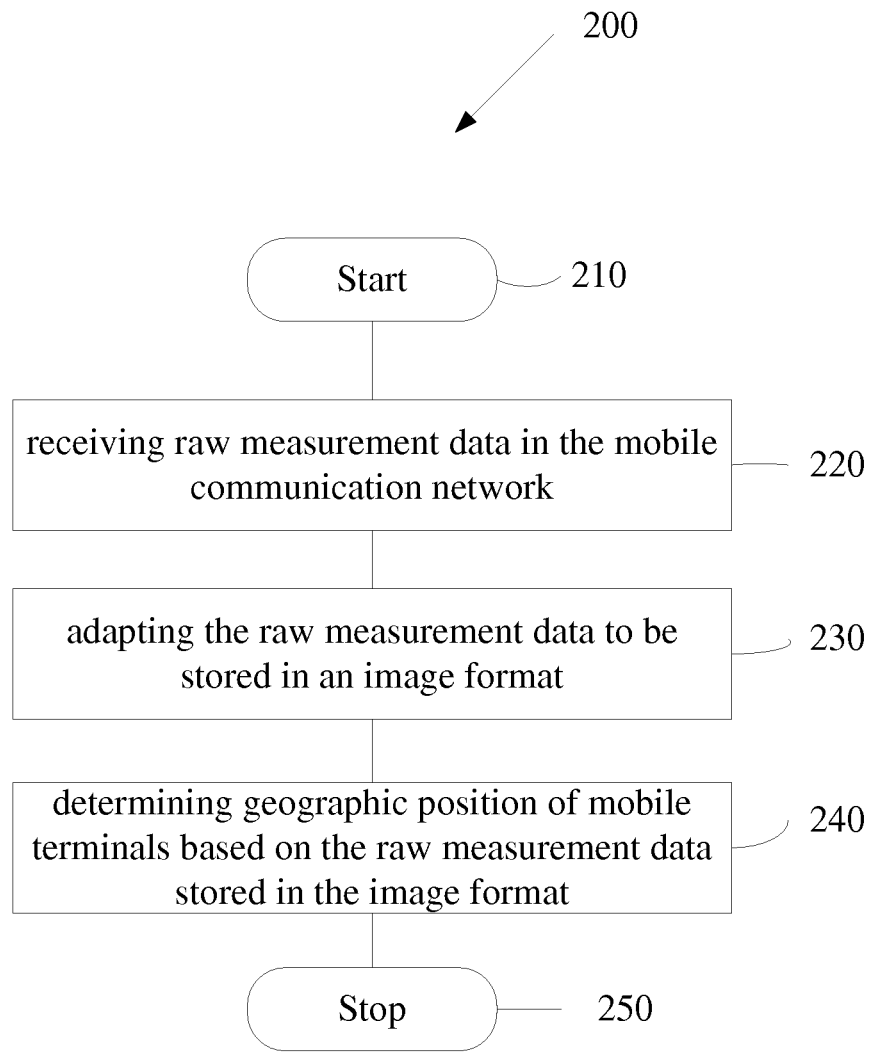
FIG. 2 is a flow diagram of an example method for determining geographic position of mobile terminals, according to one embodiment of the invention.

According to one embodiment of the invention, a method of determining geographic position of mobile terminals in a mobile communication network is provided. As shown in FIG. 2, starting at step 200, the method 200 comprises receiving raw measurement data in the mobile communication network (step 220), adapting the raw measurement data to be stored in an image format (step 230), and determining geographic position of mobile terminals based on the raw measurement data stored in the image format (step 240). The method 200 ends at step 250.

Raw measurement data may include signal strength, signal quality, timing information, and serving and neighbor cell IDs. The signal strength, for example, may be any of Received Signal Level (RxLev) in 2G, Received Signal Code Power (RSCP) in 3G, and Received Signal Receiving Power (RSRP) in LTE. The signal quality, for example, may be any of Received Signal Quality (RxQual) in 2G, Ec/NO in 3G, and Received Signal Receiving Quality (RSRQ) in LTE. Timing information, for example, may be any of Timing Advance in 2G/LTE, Round Trip Time (RTT) in 3G, UERxTx_time_difference in 3G and LTE. It should be noted that the above examples are shown only for purpose of illustration, rather than limitation to the present invention.

The raw measurement data may be adapted to be stored in a standard image format. In this way, the raw measurement data, such as the large amount of data necessary for positioning, are organized in an orderly way such that efficiency for retrieving the data can be improved.

In one embodiment of the present invention, the raw measurement data may be adapted to be stored in a bitmap (BMP) format containing RGB (i.e., Red Green Blue) information for each pixel. As is known, BMP file format is a popular and simple file format for image storage and is well supported by many software and tools. Basically, a typical 32-bit per pixel format supports 4,294,967,296 distinct colors, each pixel is defined by Alpha, Red, Green and Blue samples, in which Alpha is to indicate the transparency.

Each pixel information, such as pixel color, of a BMP file can be used to express one measurement of a cell. For example, blue can be used for signal strength, red can be used for signal quality and green can be used to indicate RTT. For another example, blue can be used for signal strength of serving cell, while red can be used for signal strength of $1^{st}$ neighbor and so on.

Figure 3:
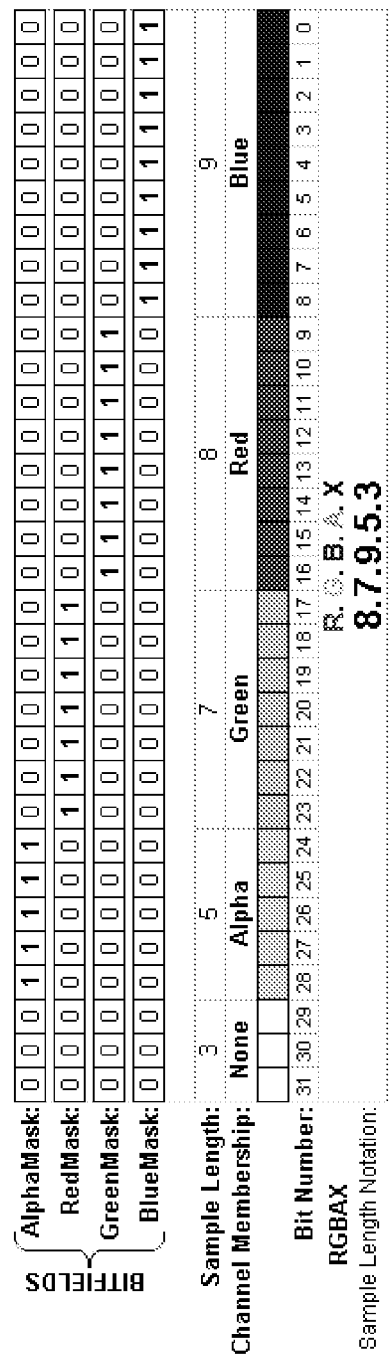
FIG. 3 is a diagram of a file header of a Bitmap (BMP) image file, in which raw measurement data are stored according to one embodiment of the present invention.
Figure 4:
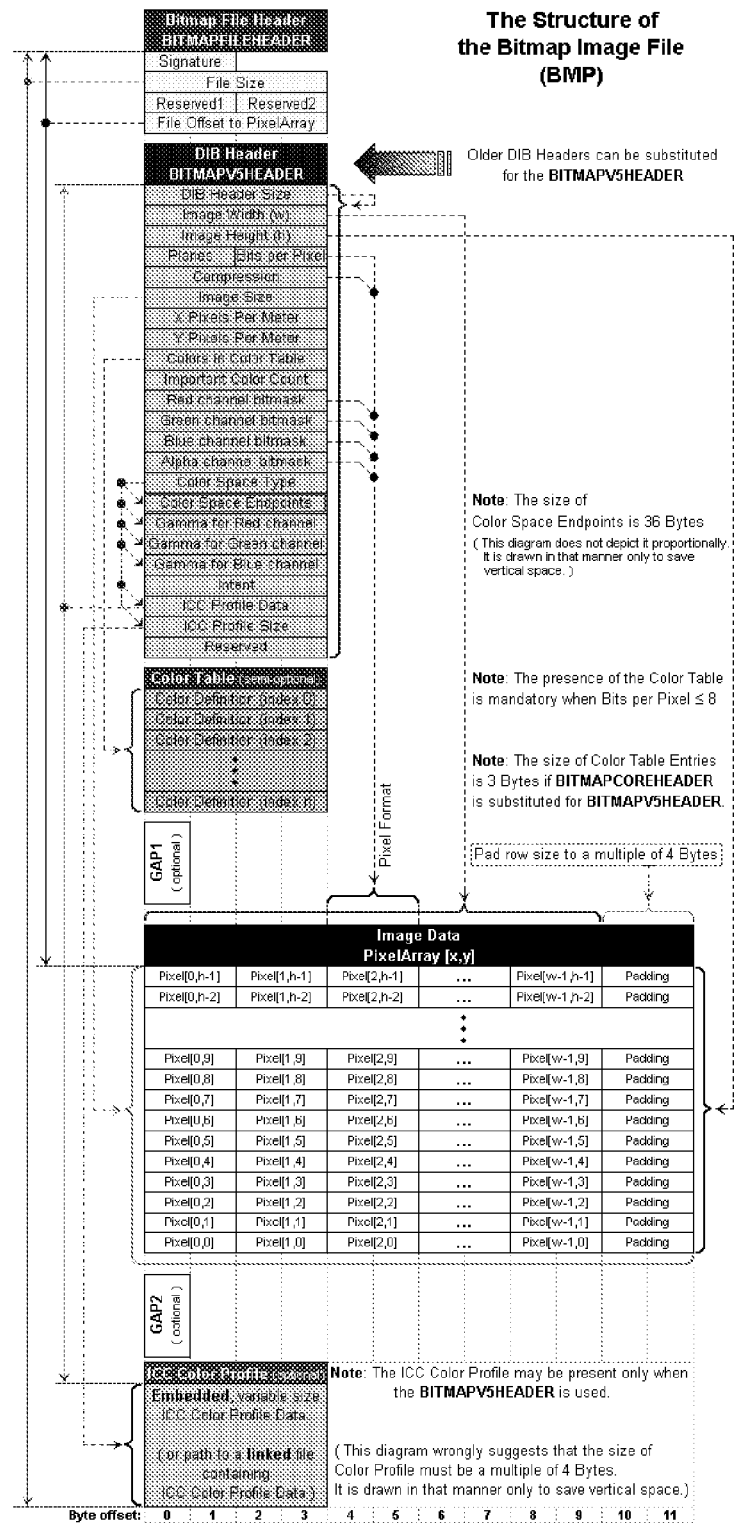
FIG. 4 is a diagram of a complete format of a Bitmap (BMP) image file, in which raw measurement data are stored according to one embodiment of the present invention.

The file header of a BMP file may define how many bits are used by each element of RGBAX (Red/Green/Blue/Alpha/None) in the image file. An example file header of the BMP file is shown in FIG. 3. As shown, blue is defined to be allocated with 9 bits, red with 8 bits, green with 7 bits and alpha with 5 bits. A complete format of a BMP file is illustrated in FIG. 4.

However, the present application is not limited thereto. The fact is that bit depth of pixel information such as pixel color can be varied depending on its application. In one example, blue, red and green can be allocated with same bit depth. That is, blue is allocated with 8 bits, red with 8 bits and green with 8 bits. In another example, more than 8 bits may be allocated to indicate some kind of measurement, such as timing information like RTT in 3G. Thus, different bit depth of a pixel can be used for different measurements.

Further, bit depths of color in BMP file may be adjusted to suit the needed resolution of the raw measurement data. For example, if it is proved that EcN0 is less sensitive to location change compared with RSCP, then EcN0 can be quantized to 6 bits to save 2 bits, and the saved 2 bits can then be used for RTT storage which makes more sense for accuracy improvement.

It is worth noting that BMP file format is a simple and convenient way of storing image and it can be easily converted to a target image format with loss or lossless. Therefore, it is to be understood by persons skilled in the art that besides BMP, the image format in which raw measurement data are adapted to be stored may comprise other kinds of image format such as Joint Photographic Experts Group (JPEG, or JPG for short), Portable Network Graphics (PNG) or the like.

In one embodiment, the raw measurement data are stored into at least one of measurement image files comprising a plurality of pixels, each pixel of a measurement image file corresponding to a geographical position with respect to a reference point. It is advantageous that each pixel in the measurement image file (such as BMP file) can be regarded as a geographical grid such that location information storage of each grid is no longer required, except that of a reference point of the image. It is noted that the reference point can be any point in the image, including but not limited to, a central or corner point of the image.

In one embodiment, the raw measurement data are stored into at least one of measurement image files in some of which each pixel information such as pixel color is used to indicate a cell corresponding to a measurement image file. For example, cell identity which is normally a big number with many digits, and is storage consuming, can be expressed with a short number, e.g. 8 bits. Specifically, in one embodiment, at a certain pixel (x, y) in a measurement image file, the closest 256 cells are found out in database first. Then these cells are sorted by distance in an ascending order. Note that cells with same distance can be further sorted by cell ID or cell name. Following the sorting, these cells are numbered from 0 to 255. In this way, each of these cells can be expressed with only 8 bits in a separate BMP file where each pixel color is used to indicate the cell corresponding to the measurement image file. This is beneficial for at least the following three reasons. One is that the closest cells are always with small numbers which facilitate the compression. The compression will be discussed in details below. Moreover, only if cell database is unique, the numbering for each pixel is unique too. Last but not the least, the above sorting and numbering method is applicable to any access type (such as 2G, 3G etc.), no matter how raw measurement data like cell ID or Access Point ID is defined.

In one embodiment of the present application, the method 200 as shown in FIG. 2 may further comprise the step of compressing the raw measurement data to be stored in an image format.

It is very likely that the raw measurement data are redundant in terms of time and space. Although existing positioning methods have introduced compression, the compression is vendor dependent and its efficiency and compression ratio is normally not optimized.

Benefits are achieved by the mechanism of storing the raw measurement data into image format and then compressing since there are already a lot of existing algorithms and methods to compress an image, which are mature and efficient. And it can be observed that various compressing algorithms and methods can be applied to the present invention as needed.

Additional benefits of the mechanism may be as follows.

In the first place, outline of an image can be extracted first, and details can be displayed later if needed. This feature is popular in image processing which is called progressive decoding and can be utilized for leveraging positioning accuracy and processing cost/time.

Further, the virtual measurement data generated by propagation model is smooth in terms of signal strength. Therefore, it is more appropriate for image storage and compression.

Moreover, for positioning technology such as fingerprinting, the neighbor grids are normally with similar radio characteristics, which is particularly convenient for image compression.

It should be noted that the compression can be chosen to be lossy or lossless as needed. In one instance, the image file for storing cell ID mentioned above is compressed in a lossless way. Further, multiple resolution representation can be used for compression. For example, data regarding rural area and urban area can be compressed with different resolution. Moreover, the compression can be applied after the full image of the raw measurement data is divided into smaller ones. Thus, advanced features (e.g., multiple resolution) can be freely used without extra development effort.

In one embodiment of the present application, the method may further comprise the step of sharing the compressed raw measurement data between two entities in the mobile communication network. The compressed raw measurement data in image format can be transferred, stored or used by a hardware or software entity, which may or may not be able to determine location of a certain object. Such entity can also be only part of the whole flow of location determination, and it may or may not be capable of wireless/wired communication. For example, the compressed raw measurement data may be shared between two user equipments or between two ordinary computers via direct or indirect data connection or storage sharing.

Figure 5:
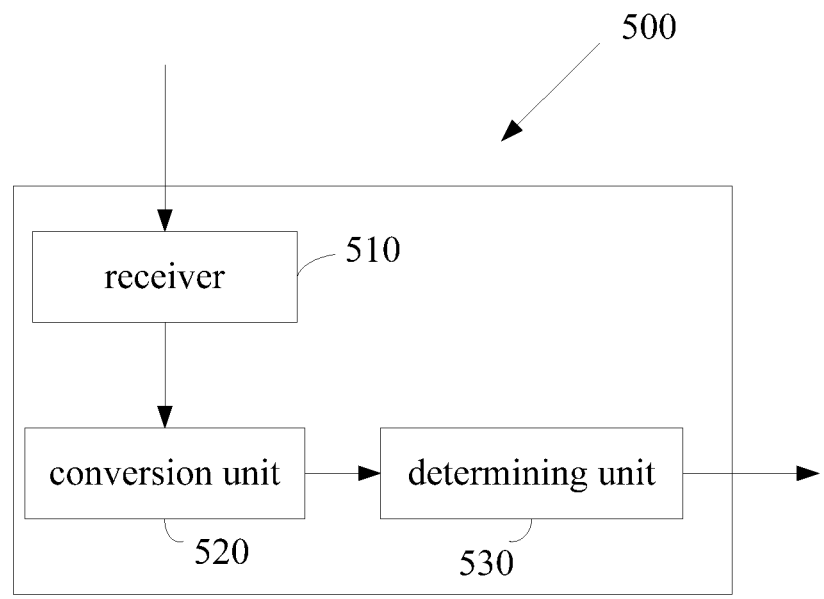
FIG. 5 is a block diagram of an example apparatus for determining geographic position of mobile terminals, according to one embodiment of the invention.

Referring to FIG. 5, an apparatus 500 for determining geographical position of mobile terminals in a mobile communication network is provided. As shown, the apparatus 500 comprises a receiver 500, a conversion unit 520 and a determining unit 530. The receiver 500 is configured to receive raw measurement data in the mobile communication network.

The conversion unit 520 is configured to adapt the raw measurement data to be stored in an image format. The determining unit 530 is configured to determine geographical position of mobile terminals based on the raw measurement data stored in the image format.

In one embodiment, the receiver 510 is configured to receive at least one of signal strength, signal quality, timing information, and serving and neighbor cell IDs. The signal strength, for example, may be any of Received Signal Level (RxLev) in 2G, Received Signal Code Power (RSCP) in 3G, and Received Signal Receiving Power (RSRP) in LTE. The signal quality, for example, may be any of Received Signal Quality (RxQual) in 2G, Ec/N0 in 3G, and Received Signal Receiving Quality (RSRQ) in LTE. Timing information, for example, may be any of Timing Advance in 2G/LTE, Round Trip Time (RTT) in 3G, UERxTx_time_difference in 3G and LTE. It should be noted that the above examples are shown only for purpose of illustration, rather than limitation to the present invention.

In one embodiment of the present invention, the conversion unit 520 is configured to adapt the raw measurement data to be stored in an image format chosen from any one of BMP, JPG and PNG. In this way, the raw measurement data, such as the large amount of data necessary for positioning, are organized in an orderly way such that efficiency for retrieving the data can be improved.

It should be noted that other units than the receiver 510, the conversion unit 520 and the determining unit 530 might exist in apparatus 500.

In accordance with one embodiment of the present invention, the apparatus 500 may further comprise a compressing unit for compressing the raw measurement data to be stored in an image format with multiple resolution representation. Although there might exists compressing unit in the positioning apparatus, the compressing unit is vendor dependent and its efficiency and compression ratio is normally not optimized. The compressing unit according to the present invention solves these problems. The combining use of a conversion unit for adapting the raw measurement data into an image format and a compressing unit for compressing the raw measurement data in image format, benefits from mature and efficient algorithms and devices to compress an image.

In accordance with one embodiment of the present invention, the apparatus 500 may further comprise an interface through which the compressed raw measurement are shared between two entities in the mobile communication network. Via the interface, the compressed raw measurement data in image format can be transferred, stored or used by a hardware or software entity, which may or may not be able to determine location of a certain object. Such entity can also be only part of the whole flow of location determination, and it may or may not be capable of wireless/wired communication. For example, the compressed raw measurement data may be shared between two user equipments or between two ordinary computers via the interface.

In accordance with one embodiment of the present invention, the apparatus 500 may further comprise a memory for storing measurement image files containing raw measurement data. It will be appreciated that the memory described herein can be either volatile memory or nonvolatile memory, or can include both volatile and nonvolatile memory.

By way of illustration, and not limitation, nonvolatile memory, for example, can be included in read only memory (ROM), programming ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM) and direct Rambus RAM (DRRAM).

In one embodiment of the present invention, an interface for sharing raw measurement data between two entities in a mobile communication network is provided, where the raw measurement data being adapted to be stored in an image format for determining geographic position of mobile terminals. The raw measurement data may be stored into at least one of measurement image files comprising a plurality of pixels, each pixel of a measurement image file corresponding to a geographical position with respect to a reference point.

Figure 6:
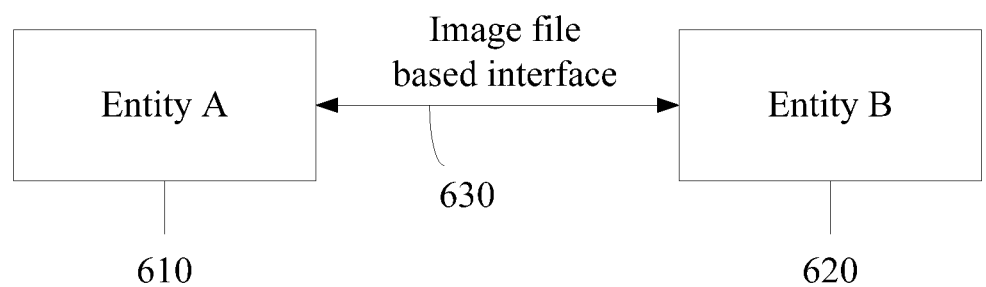
FIG. 6 is a diagram of an image file based interface according to one embodiment of the invention.

Referring to FIG. 6 now, it is seen that entity A 610 shares with entity B 620 raw measurement data via an image file based interface 630 in a general sense. It is preferable that together with the measurement image file, a description of image file is shared between two entities via interface 630. The description may comprise any of the following: (1) exact meaning of each color in image file; (2) geographical scale of the image, for example geographical distance between adjacent pixels; (3) geographical coordinates of a reference point of the image, for example those of the upper left corner point etc.

Above description information can be delivered in ways shown below. In one embodiment, the description information can be delivered in the reserved bits or specific bits in the image file itself. For example, the description information can be delivered in Reserved1 and Reserved2 of BMP file header as shown in FIG. 4, APP0 or APP1 marker in a JPG (which may otherwise used for camera type, exposure time, aperture etc.), and etc. In one embodiment, the description information can be delivered in a separate file, for example a plain text file which includes the format description. In one embodiment, the description can be delivered in file name or property remark of the image file.

It should be noted that delivery of the description information as above is optional since in some cases one entity might already be aware of the usage of an image file and can handle it automatically in a proper way.

Figure 7:
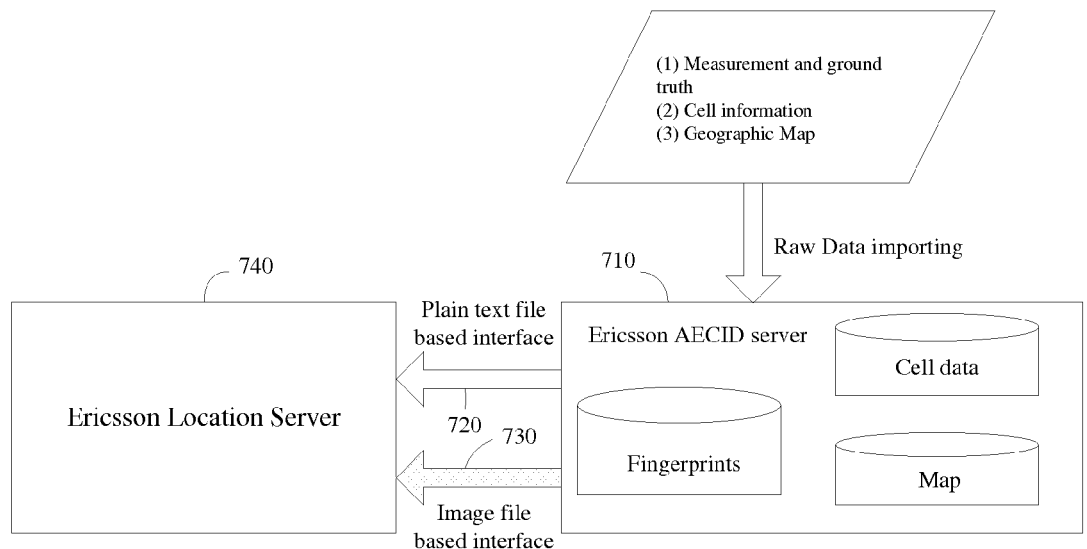
FIG. 7 is a diagram of an image file based interface according to one embodiment of the invention.

FIG. 7 illustrates an expected interface change to Ericsson positioning product according to one embodiment of the present invention. In FIG. 7, raw measurement data comprising measurement and ground truth, cell information and geographic map are imported to Ericsson AECID (Adaptive Enhanced Cell ID) server 710. AECID is one kind of fingerprinting positioning technology that refines the basic cell identity positioning method in a variety of ways. The details of AECID technology are well disclosed in T. Wigren's "Adaptive enhanced cell ID fingerprinting localization by clustering of precise position measurements", IEEE Trans. Veh. Tech., vol. 56, pp. 3199-3209, 2007. Its disclosures are thereby incorporated herein. In one embodiment, Ericsson AECID server may comprise separate memories to store fingerprints comprising measurement and ground truth, cell data/information and geographic map, respectively. It will be appreciated that AECID server may comprise only one memory to store all the information needed.

Ericsson AECID server 710 may adapt the information including measurement and ground truth, cell data and geographic map to be stored as one or more image file(s). The image file(s) is/are then transferred to Ericsson Location Server 740 via image file based interface 730. In one embodiment, Ericsson Location Server 740 may be SMLC (Serving Mobile Location Center) or GMLC (Gateway Mobile Location Center) in 3GPP context or SLP (SUPL Location Platform) in OMA (Open Mobile Alliance) context. The Location Server 740 is capable of determining geographic position of mobile terminals based on the information stored in the image file(s).

It is preferable that together with the measurement image file, a description of image file is shared between two entities via plain text file based interface 720. The description may comprise any of the following: (1) exact meaning of each color in image file; (2) geographical scale of the image, for example geographical distance between adjacent pixels; (3) geographical coordinates of a reference point of the image, for example those of the upper left corner point etc. However, it should be noted that plain text file based interface 720 is optional since in some cases Ericsson Location Server 740 might already be aware of the usage of an image file and can handle it automatically in a proper way.

Figure 8:
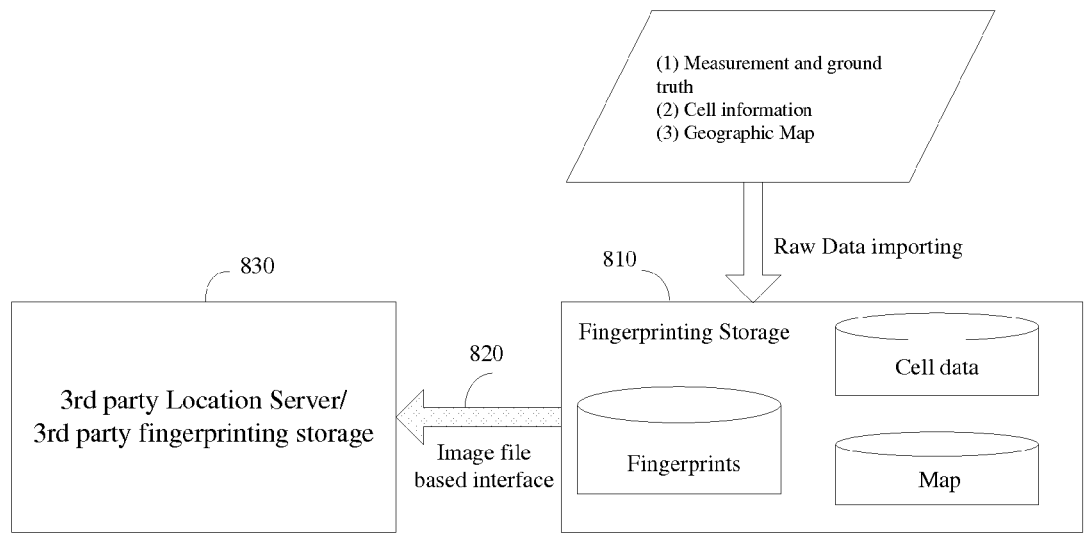
FIG. 8 is a diagram of an image file based interface according to one embodiment of the invention.

The implementation of the present invention can bring convenience to data sharing of raw measurement data, especially in case there are more than one fingerprinting technology vendors in one network. In one embodiment, the data sharing can happen between fingerprinting Storage (e.g., Ericsson AECID server) and 3$^{rd}$ party entities (e.g., other vendor's GMLC or SMLC or even a location calculation entity inside a user equipment). FIG. 8 shows a general deployment for non-Ericsson network. In FIG. 8, raw measurement data comprising measurement and ground truth, cell information and geographic map are imported to Fingerprinting Storage 810 which may in turn adapt the raw measurement data to be stored as one or more image file(s). The image file(s) is/are then transferred to 3$^{rd}$ party Location Server/3$^{rd}$ party fingerprinting storage 830 via image file based interface 820. Third party Location Server/third party fingerprinting storage 830 is capable of determining geographic position of mobile terminals based on the information stored in the image file(s).

In accordance with one embodiment of the present invention, a computer program product is provided. The product comprises a computer usable medium having a computer readable program code embodied therein. The computer readable program code is adapted to be executed to implement the methods according to the present invention.

The term "computer usable medium" as used herein refers to any medium that participates in providing instructions to processor for execution, and is an example of a machine-readable medium. The methods of determining geographic position of mobile terminals described herein may be implemented as computer program code embodied in the computer usable medium. Such a medium may take many forms, including but not limited to, non-volatile media, volatile media and transmission media.

Having thus described several aspects and embodiments of the invention, modifications and/or improvements may be apparent to those skilled in the art and are intended to be part of this disclosure. For example, the above description is focused on the fingerprinting technology, but it is to be appreciated that the invention is applicable to all fingerprinting-like positioning methods and that the principles of the invention may be used in a wide variety of applications. The above description is therefore by way of example only, and includes any modifications and improvements that may be apparent to one of skill in the art. The scope of the invention should be determined from proper construction of the appended claims and their equivalents.

What is claimed is:

1. A method of determining geographic position of mobile terminals in a mobile communication network, the method comprising:
   receiving raw measurement data in the mobile communication network;
   adapting the raw measurement data to be stored in an image format comprising a plurality of pixels, wherein each pixel of the image format represents information associated with more than one kind of data of the raw measurement data; and
   determining geographic position of mobile terminals based on the raw measurement data stored in the image format.

2. The method according to claim 1, wherein the raw measurement data comprises at least one of signal strength, signal quality, timing information, serving cell identifier (ID), and neighbor cell ID.

3. The method according to claim 1, wherein the image format is one of Bitmap (BMP), Joint Photographic Experts Group (JPG), or Portable Network Graphics (PNG).

4. The method according to claim 1, further comprising compressing the raw measurement data to be stored in the image format with multiple resolution representations.

5. The method according to claim 4, further comprising sharing the compressed raw measurement data between two entities in the mobile communication network.

6. The method according to claim 4, further comprising sharing a description for indicating the raw measurement data between two entities in the mobile communication network.

7. The method according to claim 1, wherein each pixel information of the image format is represented by a different pixel color.

8. The method according to claim 7, wherein bit depths of the pixel information of the image format are adjusted to suit needed resolution of the raw measurement data.

9. The method according to claim 1, wherein the raw measurement data are stored into at least one measurement image file of a plurality of measurement image files, wherein each pixel information of the at least one measurement image file is used to indicate a cell corresponding to the at least one measurement image file, wherein the pixel information is represented by a pixel color.

10. The method according to claim 1, wherein the raw measurement data are stored into at least one measurement image file of a plurality of measurement image files wherein each pixel of the measurement image file corresponds to a geographical position with respect to a reference point.

11. An apparatus for determining geographic position of mobile terminals in a mobile communication network, the apparatus comprising:
    a receiver configured to receive raw measurement data in the mobile communication network;
    a conversion unit configured to adapt the raw measurement data to be stored in an image format comprising a plurality of pixels, wherein each pixel of the image format represents information associated with more than one kind of data of the raw measurement data; and
    a determining unit configured to determine geographic position of mobile terminals based on the raw measurement data stored in the image format.

12. The apparatus according to claim 11, wherein the receiver is configured to receive at least one of signal strength, signal quality, timing information, serving identifier (ID), and neighbor cell ID.

13. The apparatus according to claim 11, wherein the conversion unit is configured to adapt the raw measurement data to be stored in the image format, wherein the image format is one of Bitmap (BMP), Joint Photographic Experts Group (JPG), or Portable Network Graphics (PNG).

14. The apparatus according to claim 11, further comprising a compressing unit configured to compress the raw measurement data to be stored in the image format with multiple resolution representations.

15. The apparatus according to claim 14, further comprising an interface through which the compressed raw measurement data are shared between two entities in the mobile communication network.

16. The apparatus according to claim 11, further comprising a memory for storing measurement image files containing raw measurement data.

17. An interface for sharing raw measurement data between two entities in a mobile communication network, the raw measurement data being adapted to be stored in an image format for determining geographic position of mobile terminals, wherein the image format comprises a plurality of pixels and wherein each pixel of the image format represents information associated with more than one kind of data of the raw measurement data.

18. The interface according to claim 17, wherein the raw measurement data are stored into at least one measurement image file of a plurality of measurement image files, wherein each pixel of the measurement image file corresponds to a geographical position with respect to a reference point.

19. The interface according to claim 17, further comprising sharing a description for indicating the raw measurement data between the two entities.

20. A non-transitory computer-readable storage medium having computer code stored therein, which when executed by a processor, cause the processor to perform operations comprising:
   receiving raw measurement data in a mobile communication network;
   adapting the raw measurement data to be stored in an image format comprising a plurality of pixels, wherein each pixel of the image format represents information associated with more than one kind of data of the raw measurement data; and
   determining geographic position of mobile terminals based on the raw measurement data stored in the image format.

* * * * *

UNITED STATES PATENT AND TRADEMARK OFFICE
CERTIFICATE OF CORRECTION

PATENT NO. : 9,320,008 B2
APPLICATION NO. : 14/390502
DATED : April 19, 2016
INVENTOR(S) : Zhang et al.

It is certified that error appears in the above-identified patent and that said Letters Patent is hereby corrected as shown below:

In the Specification

In Column 4, Line 37, delete "step 200," and insert -- step 210, --, therefor.

In Column 4, Line 50, delete "Ec/NO" and insert -- Ec/N0 --, therefor.

In Column 6, Line 65, delete "receiver 500," and insert -- receiver 510, --, therefor.

In Column 6, Line 66, delete "receiver 500" and insert -- receiver 510 --, therefor.

Signed and Sealed this
Second Day of August, 2016

Michelle K. Lee
*Director of the United States Patent and Trademark Office*